US011075956B2

(12) United States Patent
Burke et al.

(10) Patent No.: US 11,075,956 B2
(45) Date of Patent: **\*Jul. 27, 2021**

(54) DYNAMIC GENERATION OF POLICY ENFORCEMENT RULES AND ACTIONS FROM POLICY ATTACHMENT SEMANTICS

(71) Applicant: INTERNATIONAL BUSINESS MACHINES CORPORATION, Armonk, NY (US)

(72) Inventors: Thomas C. Burke, Durham, NC (US); Mario E. De Armas, Wellington, FL (US); Oswaldo Gago, Margate, FL (US); Gaurang Shah, Cary, NC (US); Maria E. Smith, Davie, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,946

(22) Filed: May 7, 2020

(65) Prior Publication Data

US 2020/0267188 A1 Aug. 20, 2020

Related U.S. Application Data

(63) Continuation of application No. 14/989,268, filed on Jan. 6, 2016, now Pat. No. 10,693,911, which is a (Continued)

(51) Int. Cl.
*G06F 15/173* (2006.01)
*H04L 29/06* (2006.01)
(Continued)

(52) U.S. Cl.
CPC .......... *H04L 63/20* (2013.01); *H04L 41/0893* (2013.01); *H04L 41/5019* (2013.01);
(Continued)

(58) Field of Classification Search
None
See application file for complete search history.

(56) References Cited

U.S. PATENT DOCUMENTS 6,728,748 B1 4/2004 Mangipudi
6,925,493 B1 8/2005 Barkan
(Continued)

FOREIGN PATENT DOCUMENTS

EP 2099162 B1 12/2016
WO 2010080367 A2 7/2010
WO 2010149826 A1 12/2010

OTHER PUBLICATIONS

Adrian Paschke, RBSLA: A declarative Rule-based Service Level Agreement Language based on RuleML, International Conference on Intelligent Agents, 2005, pp. 1-7, Web Technology and Internet Commerce, Vienna, Austria.
(Continued)

*Primary Examiner* — Brian Whipple
*Assistant Examiner* — Gregory P Tolchinsky
(74) *Attorney, Agent, or Firm* — Haley J. McClory

(57) ABSTRACT

At least one set of enforceable policy provisions is identified within at least one defined service level policy to be enforced during runtime by a policy enforcement point (PEP). Each set of enforceable policy provisions includes a policy subject, a reference to a policy domain, and at least one assertion. Each identified set of enforceable policy provisions is transformed by the PEP into at least one runtime-executable processing rule that each includes at least one PEP processing action that each represents an atomic unit of policy enforcement level behavior executable by the PEP to enforce the respective at least one assertion against runtime objects associated with the policy subject within an area of runtime policy enforcement specified by the policy domain.

20 Claims, 8 Drawing Sheets

Related U.S. Application Data continuation of application No. 14/224,456, filed on Mar. 25, 2014, now Pat. No. 9,270,541, which is a continuation of application No. 13/764,828, filed on Feb. 12, 2013, now Pat. No. 9,258,198.

(51) Int. Cl.
  *H04L 12/927* (2013.01)
  *H04L 12/813* (2013.01)
  *H04L 12/24* (2006.01)

(52) U.S. Cl.
  CPC ............ *H04L 47/20* (2013.01); *H04L 47/805* (2013.01); *H04L 63/0281* (2013.01); *H04L 63/102* (2013.01)

(56) References Cited

U.S. PATENT DOCUMENTS

| | | |
|---|---|---|
| 7,009,963 B1 | 3/2006 | Schulz |
| 7,243,157 B2 | 7/2007 | Levin |
| 7,272,115 B2 | 9/2007 | Maher |
| 7,730,138 B2 | 6/2010 | Ballinger |
| 7,734,784 B1 | 6/2010 | Araujo |
| 7,962,633 B1 | 6/2011 | Sidebottom |
| 7,987,253 B2 | 7/2011 | Pfitzmann |
| 8,010,678 B2 | 8/2011 | Araujo |
| 8,099,488 B2 | 1/2012 | Laye |
| 8,131,831 B1 | 3/2012 | Hu |
| 8,141,125 B2 | 3/2012 | Maes |
| 8,146,096 B2 | 3/2012 | Angelov |
| 8,224,968 B1 | 7/2012 | Chen |
| 8,281,382 B1 | 10/2012 | Sanyal |
| 8,468,586 B2 | 6/2013 | Koottayi |
| 9,213,574 B2 | 12/2015 | Karanam |
| 9,258,198 B2 | 2/2016 | Burke |
| 9,270,541 B2 | 2/2016 | Burke |
| 9,363,289 B2 | 6/2016 | Burke |
| 9,450,836 B2 | 9/2016 | Hammer |
| 9,450,837 B2 | 9/2016 | Khemani |
| 10,263,857 B2 | 4/2019 | Burke |
| 2002/0049841 A1 | 4/2002 | Johnson |
| 2002/0065864 A1 | 5/2002 | Hartsell |
| 2003/0088529 A1 | 5/2003 | Klinker |
| 2004/0103339 A1 | 5/2004 | Chalasani |
| 2004/0167979 A1 | 8/2004 | Aikens |
| 2005/0080914 A1 | 4/2005 | Lerner |
| 2005/0114494 A1 | 5/2005 | Beck |
| 2005/0177545 A1 | 8/2005 | Buco |
| 2006/0036447 A1 | 2/2006 | Roever |
| 2006/0041636 A1 | 2/2006 | Ballinger |
| 2006/0143686 A1 | 6/2006 | Maes |
| 2006/0233180 A1 | 10/2006 | Serghi |
| 2006/0274674 A1 | 12/2006 | Okita |
| 2007/0006278 A1 | 1/2007 | Ioan Avram |
| 2007/0124820 A1 | 5/2007 | Burch |
| 2007/0150936 A1 | 6/2007 | Maes |
| 2007/0186281 A1 | 8/2007 | McAlister |
| 2007/0192500 A1 | 8/2007 | Lum |
| 2007/0200671 A1 | 8/2007 | Kelley |
| 2008/0046335 A1 | 2/2008 | Zhou |
| 2008/0049648 A1 | 2/2008 | Liu |
| 2008/0127208 A1 | 5/2008 | Bedi |
| 2008/0209047 A1 | 8/2008 | Beigi |
| 2009/0006527 A1 | 1/2009 | Gingell, Jr. |
| 2009/0077621 A1 | 3/2009 | Lang |
| 2009/0132543 A1 | 5/2009 | Chatley |
| 2009/0219940 A1 | 9/2009 | Jansson |
| 2009/0225763 A1 | 9/2009 | Forsberg |
| 2009/0235325 A1 | 9/2009 | Dimitrakos |
| 2009/0248476 A1 | 10/2009 | Trinh |
| 2009/0264097 A1 | 10/2009 | Cai |
| 2009/0306999 A1 | 12/2009 | Srinivasan |
| 2010/0043050 A1 | 2/2010 | Nadalin |
| 2010/0049968 A1 | 2/2010 | Dimitrakos |
| 2010/0125477 A1 | 5/2010 | Mousseau |
| 2010/0125844 A1 | 5/2010 | Mousseau |
| 2010/0146037 A1 | 6/2010 | Little |
| 2010/0205293 A1 | 8/2010 | Hu |
| 2010/0278119 A1 | 11/2010 | Potkonjak |
| 2010/0287599 A1 | 11/2010 | He |
| 2011/0010751 A1 | 1/2011 | Soulhi |
| 2011/0022662 A1 | 1/2011 | Barber-Mingo |
| 2011/0047274 A1 | 2/2011 | Kuo |
| 2011/0131307 A1 | 6/2011 | El Bazzal |
| 2011/0271321 A1 | 11/2011 | Soppera |
| 2011/0282907 A1 | 11/2011 | Ramsey |
| 2011/0283224 A1 | 11/2011 | Ramsey |
| 2012/0011517 A1 | 1/2012 | Smith |
| 2012/0023063 A1 | 1/2012 | Fenton |
| 2012/0131091 A1 | 5/2012 | Yamuna |
| 2012/0131135 A1 | 5/2012 | Yamuna |
| 2012/0158931 A1 | 6/2012 | Ohlman |
| 2012/0210003 A1 | 8/2012 | Castro |
| 2012/0216046 A1 | 8/2012 | McDougal |
| 2013/0019018 A1 | 1/2013 | Rice |
| 2014/0082366 A1 | 3/2014 | Engler |
| 2014/0094159 A1 | 4/2014 | Raleigh |
| 2014/0173687 A1 | 6/2014 | Dimitrakos |
| 2014/0229594 A1 | 8/2014 | Burke |
| 2014/0229595 A1 | 8/2014 | Burke |
| 2015/0304231 A1 | 10/2015 | Gupte |
| 2016/0119383 A1 | 4/2016 | Burke |
| 2019/0014014 A1 | 1/2019 | Burke |

OTHER PUBLICATIONS

Amos E. Reed, et al., Standards for Adult Local Detention Facilities (as in Office Action for U.S. Appl. No. 13/764,847), Second Edition, Apr. 1981, pp. 1-84, American Correctional Association, College Park, MD, USA.

Anne Anderson, et al., Oasis: XACML profile for Web-services, Specification, Sep. 29, 2003, pp. 1-41, Oasis Open, USA.

Anne H. Anderson, Domain-Independent, Composable Web Services Policy Assertions, Proceedings of the Seventh IEEE International Workshop on Policies for Distributed Systems and Networks, Jun. 5-7, 2006, pp. 1-4 (plus one citation page added), IEEE Computer Society, Washington, DC, USA.

Author Unknown, Oracle® Fusion Middleware, Security and Administrator's Guide for Web Services, 11g Release (11.1.1.6), Nov. 2011, pp. 1-738, Oracle Corporation, USA.

Claudio Agostino Ardagna, et al., Web Service Architecture for Enforcing Access Control Policies, Preliminary Version for later publication in Journal: Electronic Notes in Theoretical Computer Science, 2004, pp. 1-15, Elsevier B. V., The Netherlands.

Dimitar Angelov, et al. (W3C Web Services Policy Working Group), Web Services Policy 1.5—Attachment, W3C Specification, Sep. 4, 2007, pp. 1-49, World Wide Web Consortium W3C, Published online at: http://www.w3.org/TR/ws-policy-attacht#CalculatingEffectivyPolicywithWSDL1.1.

Elionildo Da Silva Menezes, et al., A Policy Management Framework Using Traffic Engineering in DiffServ Networks, Lecture Notes of the Quality of Service in Multiservice IP Networks International Workshop, LNCS vol. 1989, Jan. 24-26, 2001, pp. 331-345 (plus two citation pages added), Springer-Verlag, Berlin/Heidelberg, Germany.

Florian Rosenberg, et al., Integrating Quality of Service Aspects in Top-Down Business Process Development using WS-CDL and WS-BPEL, Proceedings of the 11th IEEE International Enterprise Distributed Object Computing Conference (EDOC) 2007, pp. 1-12, IEEE Computer Society, Washington, DC, USA.

Martha Young, Policy-Based Network Management: Finally?, Journal: Business Communications Review, Aug. 2002, pp. 48-51 (plus one citation page added), vol. 32, No. 8, BCR Enterprises, USA.

US 11,075,956 B2

DYNAMIC GENERATION OF POLICY ENFORCEMENT RULES AND ACTIONS FROM POLICY ATTACHMENT SEMANTICS

BACKGROUND

The present invention relates to service level agreement (SLA) policy enforcement. More particularly, the present invention relates to dynamic generation of policy enforcement rules and actions from policy attachment semantics.

Service level agreements (SLAs) are contracts for services formed between consumers and service providers. For example, a consumer may enter into a service level agreement with a service provider to send and/or receive an agreed number of messages (e.g., text messages) per month for a contracted/set fee. The SLA may further specify that if the consumer exceeds the agreed number of messages per month associated with the contracted/set fee, an additional per message fee will be charged for each additional message.

SUMMARY

A method includes, by a processor operating at a policy enforcement point (PEP), identifying, within at least one defined service level policy to be enforced during runtime by the PEP, at least one set of enforceable policy provisions that each specifies a policy subject, a reference to a policy domain, and at least one assertion; and transforming each identified set of enforceable policy provisions of the at least one defined service level policy into at least one runtime-executable processing rule that each includes at least one PEP processing action that each represents an atomic unit of policy enforcement level behavior executable by the PEP to enforce the respective at least one assertion against runtime objects associated with the policy subject within an area of runtime policy enforcement specified by the policy domain.

A system that performs the method and a computer program product that causes a computer to perform the method are also described.

DETAILED DESCRIPTION

Figure 1:
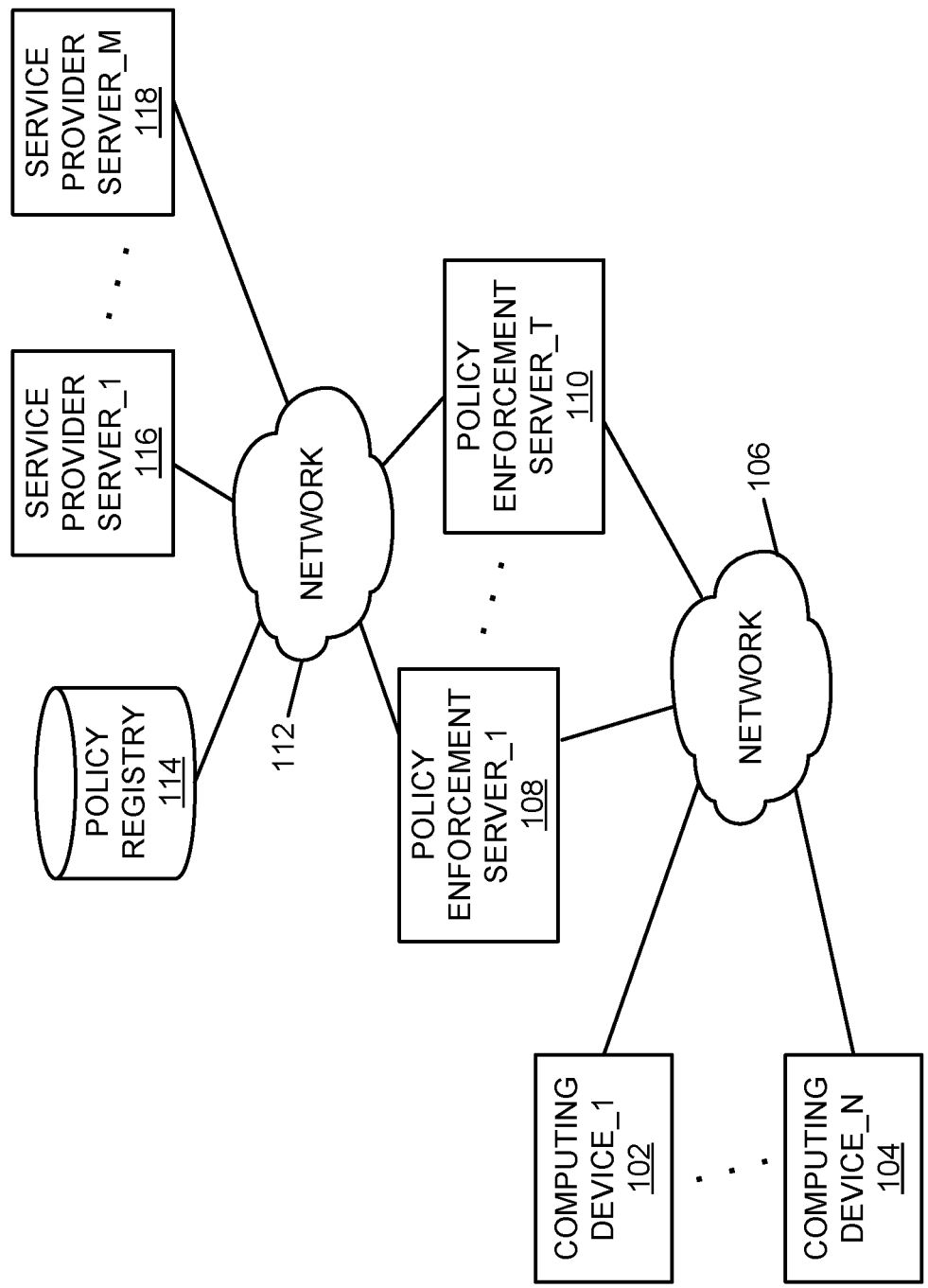
FIG. 1 is a block diagram of an example of an implementation of a system for dynamic generation of policy enforcement rules and actions from policy attachment semantics according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic generation of policy enforcement rules and actions from policy attachment semantics. The present technology involves automated policy transformation and runtime enforcement to allow policies within a policy domain (e.g., service provider policy domain, etc.) to be associated with any runtime object (e.g., objects representing specific consumers, organizations, service resources, etc.) that needs to be controlled or regulated by that policy. Those policies may be enforced against the runtime object(s) at policy enforcement points (PEPs) that operate to provide proxy service offerings including policy enforcement. Examples of runtime objects against which policies may be enforced include transactions, web requests, database requests, representational state transfer (REST) services, and web applications. The control or regulation of the runtime object by policy may be further determined based upon the content of that object at runtime, such as user credentials. Policies may be attached at an object level for an object, thereby enhancing the specificity of policy enforcement based upon the granularity of the respective objects (e.g., at the level of specific consumers, organizations, service resources, etc.) and based upon the content of those objects at runtime.

To implement the present technology, a device, such as a PEP, programmatically and dynamically transforms defined service policies, which are defined using policy attachment semantics, into runtime processing rules that encapsulate runtime processing actions (collectively runtime "policy enforcement rules") that are to be executed against runtime objects to enforce the provisions (e.g., defined via the policy attachment semantics) of the defined policies. To transform the defined service policies, the device obtains one or more defined service policies to be enforced by the PEP. The defined service policies that are obtained are parsed to identify enforceable policy provisions, such as policy constraints (e.g., number of messages per agreement). A policy subject, a policy domain, and one or more assertions are identified as the enforceable policy provisions within each defined service policy. Additionally, an optional policy schedule and policy effective dates may be included in policy attachments. One or more runtime processing rules that include at least one processing action usable by the PEP to enforce the identified policy subject, policy domain, and the assertion(s) of each defined service policy are defined. The PEP may then apply the defined processing rules and the encapsulated processing actions against runtime objects to enforce the original service policy definitions.

To transform the defined service policies into the runtime processing rules and processing actions, intermediate proxy policy objects are created that operate as intermediate effective policies. The proxy policy objects support the proxy service offerings and constraints for policy enforcement provided by PEPs, as described herein. The creation of policy enforcement rules that include runtime processing rules and processing actions to support the runtime enforcement of defined policies involves the creation of these intermediate policy proxy objects that include information from the original policy that is under transformation. These intermediate policy proxy objects provide a framework and foundation for creation of the actual runtime policy enforcement rules including the processing rules and processing actions.

The present technology may be applied, for example, to implement service level agreements (SLAs) within a service oriented architecture (SOA) network appliance engine. The present technology may be implemented, for example, using higher-level gateway platform actions rather than low-level code. As such, implementation may be performed at a layer of abstraction above the encoding level for the respective appliance engines. It should be noted that the present technology may be implemented with a variety of policy constructs and is not limited to particular variations of how policies are constructed. Accordingly, the present technology may be flexibly applied across a variety of service platforms.

It should be noted that conception of the present subject matter resulted from recognition of certain limitations associated with policy administration and enforcement. For example, it was observed that policy administrators are tasked with implementing and maintaining policies to support service level definitions (SLDs) and service level agreements (SLAs), and that the domain of policy enforcement has become increasingly complex as systems have increased in size and feature sets. This process of having administrators manually implement and maintain policies was observed to be a time consuming task that is prone to errors, particularly due to the increased size and complexity of the systems and feature sets available within these systems. For example, it was observed that where multiple SLAs are attached to a service, subsequent changes that affect multiple consumers may require the identification and editing of multiple configured policy enforcement rules and actions associated with those policy enforcement rules, but that identification of all applicable policy enforcement rules and actions was difficult. It was further observed that manual updating of the applicable policy enforcement rules that were able to be identified may require extensive efforts, and that this processing is again prone to errors. It was further determined that there are several issues that have arisen with the increased size and complexity of policy administration and enforcement systems. For example, it was determined that scalability cost, maintainability, agility, and operational stability are all factors to be addressed within policy administration and enforcement for such system implementations. As such, in view of the observations and determinations described above, the present subject matter improves policy administration and enforcement by providing for dynamic generation of policy enforcement rules and actions from policy attachment semantics, as described above and in more detail below.

Several definitions are utilized within the following description, and some are repeated and further defined below. The term "service policy" or "policy" as utilized herein represents any mediation enforcement provision, routing provision, security provision, or any other custom policy/provision that is written to a specification that a policy enforcement system may implement. As such, a service policy may be implemented as a web service (e.g., web services description language (WSDL)), as a representational state transfer (REST) implementation or service, as a web application (e.g., plain old XML (POX)) implementation, as a database request, or otherwise as appropriate for the given implementation.

Regarding service policies, a service level agreement (SLA) is a service policy that represents an agreement (e.g., a contract for services) between a service provider and a consumer where a level of service is formally defined and agreed between the parties to the SLA. The SLA records a common understanding about services, priorities, responsibilities, guarantees, warranties, and any other particulars of the agreement. Examples of SLAs include business services such as a web service, a REST service, and a web application. The SLA may specify, for example, the levels of availability, serviceability, performance, operation, or other attributes of the service to be provided by the service provider to the consumer. As a further example, an SLA may represent a processing agreement such as a transaction rate, a processor utilization level, a disk utilization level, and a memory utilization level for the business service.

A service level definition (SLD) represents a service policy that protects the service provider infrastructure access and utilization constraints, such as for example from accesses by non-contracting entities for which an SLA has not been established, or to limit a maximum resource utilization to prevent service degradation (e.g., maximum number of messages per minute). An SLD, when attached to a policy subject, is enforced by a policy enforcement point (PEP). A "policy subject" represents an entity with which a policy (e.g., an SLA or SLD) may be associated, such as for example, an endpoint of a transaction, a message, a resource, an operation or other entity.

A policy administration point (PAP) represents a location (e.g., repository, registry, etc.) where policies such as SLAs and SLDs may be created, stored, accessed, and modified. A WebSphere® service registry and repository (WSRR) represents one possible example of a PAP. A policy enforcement point (PEP) represents an intermediary system that operates to enforce defined policies. The PEP provides proxy service offerings including policy enforcement. A "policy framework" represents the infrastructure used to convert supported policy vocabularies into processing actions and processing rules.

Regarding transformation of service policies, as a first phase of policy transformation, a service policy is transformed into one or more intermediate (or local) policy entities. The intermediate policy entities are termed herein in the alternative as a "proxy policy," a "proxy policy object," and an "effective policy." Each of these terms represents an intermediate policy entity created based upon information within the original service policy (e.g., SLD or SLA, etc.)

that may be used to create runtime enforcement logic to enforce the respective service policies.

As a second phase of policy transformation, the intermediate proxy policy entities are transformed into one or more "processing actions" that represents an atomic unit of behavior defined based upon a policy to be implemented by a PEP. A "processing rule" or "policy enforcement processing rule" as described herein represents an ordered sequence of processing actions defined based upon a policy to be implemented by a PEP. One or more processing rules may be collected into a "policy enforcement rule." As such, the term "policy enforcement rule" as used herein represents one or more processing rules to be enforced to perform policy enforcement. An "SLA check" represents a gateway operation at a PEP that is used to determine the SLA policy enforcement rules created from defined policies that are to be implemented during runtime by that PEP and applied to a particular transaction (e.g., to a message).

For example, a policy may be specified as an SLA between a service provider and a consumer. Each consumer may have its own selected service options. As such, for purposes of the present example, it is assumed that two consumers have selected different service plans for a particular service. Within this example, one consumer has selected a "default" service level defined within the service provider domain for this particular service offering at a level of one hundred (100) allowed requests per hour. Similarly, another consumer has selected a higher-tier service level, identified within the present example as a "gold" service level, with a service offering of five hundred (500) allowed requests per hour. As such, enforcement of this SLA by a PEP would involve identification of the respective consumers, correlation of the respective consumers with their selected service plans/levels, and monitoring of request rates (e.g., message rates, transaction rates, etc.) for each consumer based upon their respective selected plans. If a threshold number of requests per hour associated with a selected plan is reached, the PEP would then invoke processing to identify any additional service requests as overages relative to the plan or prevent the service requests, as appropriate for a given implementation. Similarly, if a consumer issues a request that is authorized based upon the selected service plan, the PEP is responsible for ensuring that the request is satisfied for the consumer by the service provider.

The present technology enhances policy enforcement point (PEP) functionality to transform defined service policies (e.g., SLAs and SLDs) associated with a policy administration point (PAP) into policy enforcement rules and actions that are enforced by the PEP. The automated transformation of the defined policies involves transformation from the defined policy definitions/semantics to policy enforcement rules and actions that are operable by the PEP platform to enforce the defined policies. The policy enforcement rules and actions are dynamically implemented and enforced on a transactional basis during runtime as transactions associated with the defined policies occur (e.g., as messages are received).

Example transformations include transformation of a defined service policy into one or more processing actions in a normalized and interchangeable format. The normalized and interchangeable format may include, for example, a language such as extensible markup language (XML), XML stylesheet language for transformations (XSLT), object-oriented languages such as Java™ and C++ programming languages, relational database management (RDBM) languages such as structured query language (SQL), and scripting languages/implementations such as PHP: Hypertext Preprocessor (PHP) and Perl.

It should be noted that the PEP processing technology described herein operates as a proxy for both the service providers and the consumers to enforce the various provisions of defined SLAs and SLDs. As such, the PEP represents a proxy component/entity for both the service provider(s) and for the consumer(s). Within this proxy context for policy enforcement, the PEP operates to protect the interests of the service providers to ensure that no unauthorized consumers access the respective services provided by the service providers and to ensure that consumers that are authorized do not exceed the defined SLDs associated with the services and service providers. Similarly, the PEP operates to protect the interests of consumers and service providers to ensure that the SLA(s) for which the consumers and service providers have contracted are upheld/enforced. To fulfill this dual-proxy role, the PEP operates as a proxy intermediary for both of the respective entities to analyze messages communicated between the respective entities and to enforce policy enforcement rules that are defined in association with the PEP based upon policies associated with the respective services and agreements.

As described above, the present technology provides for the programmatic creation of policy enforcement rules populated with processing actions from policies defined in association with the respective services and agreements. The following pseudo-syntax policy example represents one possible implementation of a defined service policy for which policy enforcement rules populated with processing actions may be programmatically created, and that may be enforced by a PEP.

```
<wsp:Policy>
    <dpe:summary>
        <description>
            Implements WS Security Policy 1.1 - UsernameToken 1.0 support
        </description>
    </dpe:summary>
    <wsp:ExactlyOne>
        <!--UsernameToken 10 -->
        <wsp:All>
            <sp:SupportingTokens>
                <wsp:Policy>
                    <sp:UsernameToken sp:IncludeToken="IncludeToken/Always">
                        <wsp:Policy>
                            <sp:WssUsernameToken10/>
                        </wsp:Policy>
                    </sp:UsernameToken>
                </wsp:Policy>
```

```
        </sp:SupportingTokens>
      </wsp:All>
   </wsp:ExactlyOne>
</wsp:Policy>
```

Based upon the pseudo-syntax policy example above, a "UserNameToken 1.0" is defined with an "ExactlyOne" constraint (represented via a tag pair), such that only one user name token may be present in any message proxied by a PEP. Additionally, the pseudo-syntax policy example above further specifies that the user name token must always be present within any message by specifying the "IncludeToken/Always" constraint (represented via an additional tag pair). A policy of "sp:WssUsernameToken10" represents a policy to be enforced for all messages (also represented within an additional tag pair) that identify the username token version one (1.0) ("Basic Auth") is required.

Attaching the "UserNameToken 1.0" policy to a service that is proxied by a PEP results in a filter action being programmatically created. The filter action may be implemented to analyze incoming messages and to determine whether the specified components are part of the incoming message. If the specified components are not present within a particular incoming message, the message is rejected. If the specified components are present, the message is allowed to continue. As such, it is by the creation and implementation of the message filtering action from the original policy that the "UserNameToken 1.0" policy is enforced by the PEP.

The following pseudo-syntax policy enforcement rule example may be programmatically created from the pseudo-syntax policy example above for enforcement within a PEP.

| Service_18_6-1-2-request-rule-suptoken | |
|---|---|
| mAdminState | enabled |
| UserSummary | handle-supporting-token |
| Type | filter |
| Input | INPUT |
| Transform | store:///required-elements-filter.xsl |
| Output | NULL |
| NamedInOutLocationType | default |
| Transactional | off |
| SOAPValidation | body |
| SQLSourceType | static |
| Asynchronous | off |
| ResultsMode | first-available |
| RetryCount | 0 |
| RetryInterval | 1000 |
| IteratorType | XPATH |
| Timeout | 0 |
| MethodRewriteType | GET |
| MethodType | POST |
| MethodType2 | POST |

As can be seen from the pseudo-syntax policy enforcement rule example above, the policy enforcement rule is "enabled" within the "mAdminState" field, a "Type" of "filter" is specified, and the filtering action is applied to the "INPUT" stream specified in the "Input" field. The "Transform" field specifies a stylesheet to execute as part of policy action. The "Output" field specifies the name of a stream where the output of the action is to be stored.

As such, a policy framework, as described in more detail below, consumes policies, such as the pseudo-syntax policy example above for enforcement by a PEP. To enforce the respective policies, the policy framework generates policy enforcement rules that include processing actions, such as the example filtering action described above for messages to enforce the associated policy. It should be noted that consumption of defined service policies and transformation of those service policies to enforceable processing rules and processing actions may be repeated with consistency of results. As such, one device, such as a PEP, may be configured to consume and transform policies to create processing rules, and to distribute the created processing rules to other PEPs for enforcement along with enforcement by the PEP that performed the transformation, which provides one possible option for consistent policy enforcement results across multiple of PEPs. Alternatively, each PEP of a multiple PEP environment may be configured to consume and transform service policies into processing rules with consistent transformation results across a set of PEPs, which may also result in consistent policy enforcement results. As such, a variety of policy transformation processing options may be available and utilized based upon implementation details as appropriate for the respective implementation.

Further, as policies change over time, the associated policy enforcement rules and processing actions may be modified, added, deleted, or otherwise changed to implement any changes to the respective policies that have changed. As such, the present technology may provide for repeatability of implementation. The present technology may further improve scalability of costs, maintainability, agility, and operational stability.

The dynamic generation of policy enforcement rules and actions from policy attachment semantics described herein may be performed in real time to allow prompt creation of policy enforcement rules and run-time actions from registered SLA policy attachment semantics. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for dynamic generation of policy enforcement rules and actions from policy attachment semantics. A computing device_1 102 through a computing device_N 104 represent consumer client devices that utilize services specified by SLAs. The computing device_1 102 through the computing device_N 104 may communicate with one another and with other devices via a network 106. A policy enforcement server_1 108 through a policy enforcement server_T 110 represent policy enforcement points (PEPs), as described above. The policy enforcement server_1 108 through the policy enforcement server_T 110 communicate and interconnect via a network 112 with a policy registry 114 that stores policies (e.g., SLDs and SLAs) generated by one or more of a service provider server_1 116 through a service provider server_M 118. It should be noted that the network 106 and the network 112 are illustrated as separate networks for ease of description, and that any arrangement of interconnection may be utilized as appropriate for a given implementation.

The service provider server_1 116 through the service provider server_M 118 represent service capable devices (e.g., messaging devices for text messages, etc.). The service provider server_1 116 through the service provider server_M 118 also represent administrative devices that may be utilized by service provider administrators for policy creation, such as creation of SLDs and SLAs.

As described above, policies implemented by service provider administrators via devices, such as the service provider server_1 116 through the service provider server_M 118, may be stored within the policy registry 114 for enforcement by PEPs, such as the policy enforcement server_1 108 through the policy enforcement server_T 110. The policy enforcement server_1 108 through the policy enforcement server_T 110 each implement a policy framework as described above and in more detail below for transformation of defined service policies stored in the policy registry 114 into policy enforcement rules that include processing rules and processing actions that are to be enforced during runtime against objects. The objects may be of varying granularity (e.g., at the level of specific consumers, organizations, service resources, etc., as described above) based upon the particular scope and configuration of the respective policies to be enforced for the respective service providers and consumers.

A PEP may be implemented via each of the policy enforcement server_1 108 through the policy enforcement server_T 110. The PEP has the role of enforcing policies defined outside or within the PEP. The PEPs operate as gateways that provide virtual services that proxy policy enforcement operations for the real backend services. The PEPs protect and optimize transactions flowing through the respective network(s) on behalf of the backend services. As such, the policy enforcement server_1 108 through the policy enforcement server_T 110 each represent proxy gateways that provide proxy services for the service providers represented by the service provider server_1 116 through the service provider server_M 118 and for consumers represented by the computing device_1 102 through the computing device_N 104.

It should be noted that there may be a many-to-one relationship of PEPs to service providers. Each PEP may create its own policy enforcement rules based upon policies to be enforced for a given service provider. By use of the present technology, the policy enforcement rule creation from defined policies may be consistently repeated across the set of PEPs that are designated to enforce the respective policies.

As will be described in more detail below in association with FIG. 2 through FIG. 8, the policy enforcement server_1 108 through the policy enforcement server_T 110 may each provide automated dynamic generation of policy enforcement rules and actions from policy attachment semantics. The automated dynamic generation of policy enforcement rules and actions from policy attachment semantics is based upon creation of the policy enforcement rules and actions to be enforced during runtime to fulfill the respective SLDs and SLAs established for messaging management within the system 100. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a service provider messaging server, a web server, application server, or other data server device, or any other device capable of processing information as described above and in more detail below.

The network 106 and the network 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
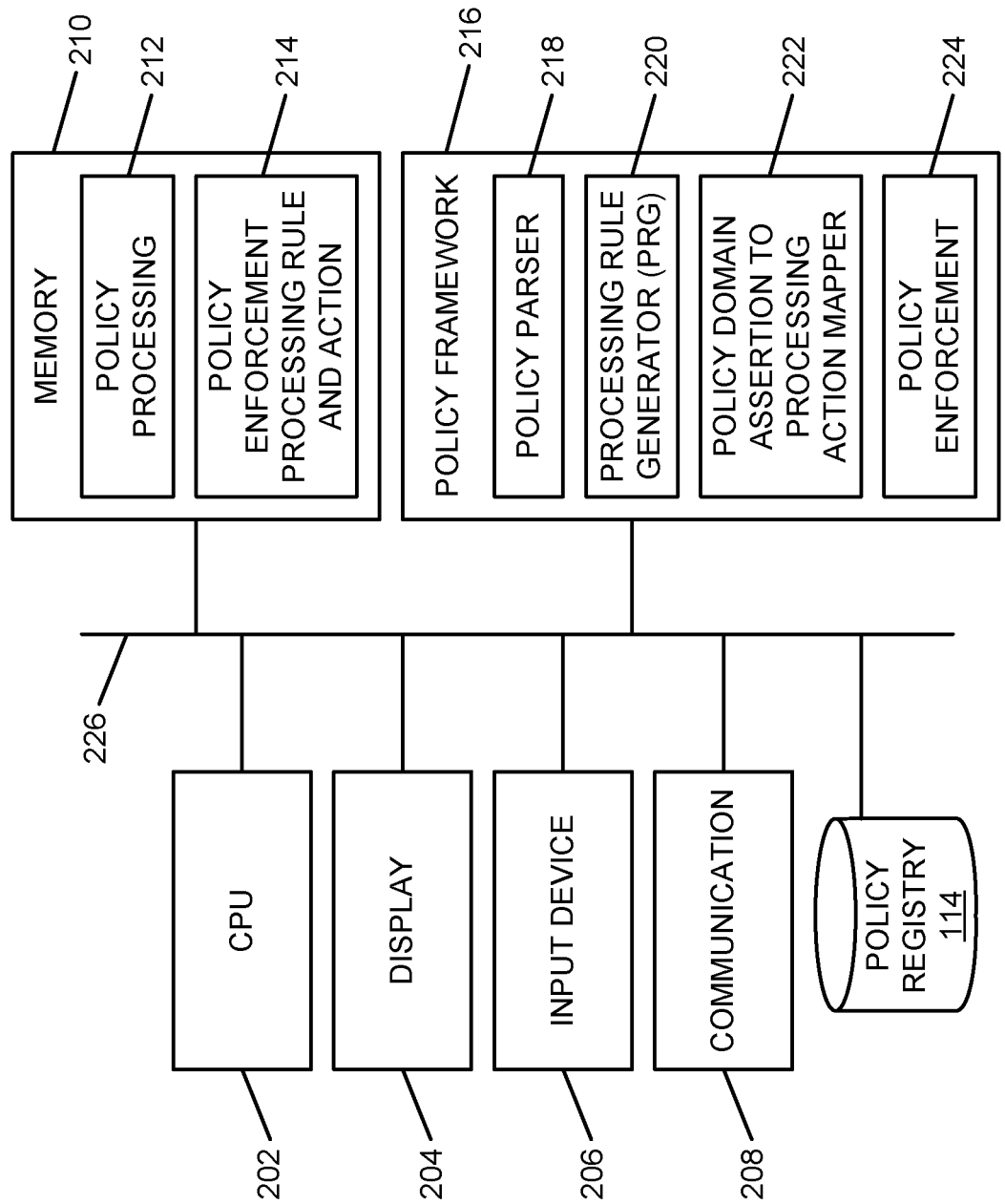
FIG. 2 is a block diagram of an example of an implementation of a core processing module capable of performing dynamic generation of policy enforcement rules and actions from policy attachment semantics according to an embodiment of the present subject matter.

FIG. 2 is a block diagram of an example of an implementation of a core processing module 200 capable of performing dynamic generation of policy enforcement rules and actions from policy attachment semantics. The core processing module 200 may be associated with either the policy enforcement server_1 108 through the policy enforcement server_T 110 to implement the dynamic generation of policy enforcement rules and actions from policy attachment semantics described herein. It should, however, be noted that components of the core processing module 200 may additionally or alternatively be associated with the computing device_1 102 through the computing device_N 104 or with the service provider server_1 116 through the service provider server_M 118, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of policy enforcement rule creation and policy enforcement via the created policy enforcement rules in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a policy processing storage area 212 that provides memory space for the creation of policies (e.g., SLAs and SLDs) in association with the core processing module 200 when implemented, for example, in association with one or more of the service provider server_1 116 through the service provider server_M 118. Additionally, the policy processing storage area 212 provides memory space for the creation of policy enforcement rules and associated runtime processing actions to support the runtime enforcement of defined policies (e.g., SLAs and SLDs) in association with the core processing module 200 when implemented, for example, in association with one or more of the policy enforcement server_1 108 through the policy enforcement server_T 110.

The policy processing storage area 212 also provides storage for policy proxy objects that operate as intermediate effective policies that encapsulate policy information from repository service policies that is usable for runtime policy enforcement. As described above, creation of policy enforcement rules that include runtime processing rules and processing actions to support the runtime enforcement of defined policies involves the creation of intermediate policy proxy objects that include information from the original policy that is under transformation. These intermediate policy proxy objects provide a framework and foundation for creation of the actual runtime policy enforcement rules including the processing rules and processing actions.

The memory 210 also includes a policy enforcement processing rule and action storage area 214 that provides storage space for created policy enforcement rules and associated runtime processing actions. As described above, the created policy enforcement rules and associated runtime processing actions may be utilized for runtime enforcement of defined policies (e.g., SLAs and SLDs) in association with the core processing module 200 when implemented, for example, in association with one or more of the policy enforcement server_1 108 through the policy enforcement server_T 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A policy framework module 216 is also illustrated. The policy framework module 216 provides policy enforcement rule creation and runtime enforcement of processing actions for the core processing module 200, as described above and in more detail below. The policy framework module 216 implements the dynamic generation of policy enforcement rules and actions from policy attachment semantics of the core processing module 200.

The policy framework module 216 includes several sub-components or sub-modules. A policy parser 218 parses policy definitions for SLDs and SLAs to identify policy constraints to be implemented during runtime processing of messages. A processing rule generator (PRG) 220 generates policy enforcement rules from the runtime constraints associated with policies parsed by the policy parser 218. A policy domain assertion to policy action mapper 222 provides policy mapping to policy enforcement rules within the policy framework module 216. Given a policy domain and a list of assertions, the policy domain assertion to policy action mapper 222 maps or converts each policy domain assertion identified within the runtime constraints parsed by the policy parser 218 to corresponding runtime processing actions to be enforced for messages processed by the policy framework module 216. The processing rule generator (PRG) 220 then populates the respective created policy enforcement rule with the created runtime processing actions. The created policy enforcement rules and processing actions may be stored within the policy enforcement processing rule and action storage area 214 of the memory 210. A policy enforcement module 224 implements the created policy enforcement rules and runtime processing actions created from the original policy definitions.

It should also be noted that the policy framework module 216 may form a portion of other circuitry described without departure from the scope of the present subject matter. Further, the policy framework module 216 may alternatively be implemented as an application stored within the memory 210. In such an implementation, the policy framework module 216 may include instructions executed by the CPU 202 for performing the functionality described herein. The CPU 202 may execute these instructions to provide the processing capabilities described above and in more detail below for the core processing module 200. The policy framework module 216 may form a portion of an interrupt service routine (ISR), a portion of an operating system, a portion of a browser application, or a portion of a separate application without departure from the scope of the present subject matter.

The policy registry 114 is also shown associated with the core processing module 200 within FIG. 2 to show that the policy registry 114 may be coupled to the core processing module 200 without requiring external connectivity, such as via the network 106 or the network 112.

The CPU 202, the display 204, the input device 206, the communication module 208, the memory 210, the policy framework module 216, and the policy registry 114 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the policy registry 114 is illustrated as a separate component for purposes of example, the information stored within the policy registry 114 may also/alternatively be stored within the memory 210 without departure from the scope of the present subject matter. Accordingly, the core processing module 200 may take many forms and may be associated with many platforms.

Figure 3:
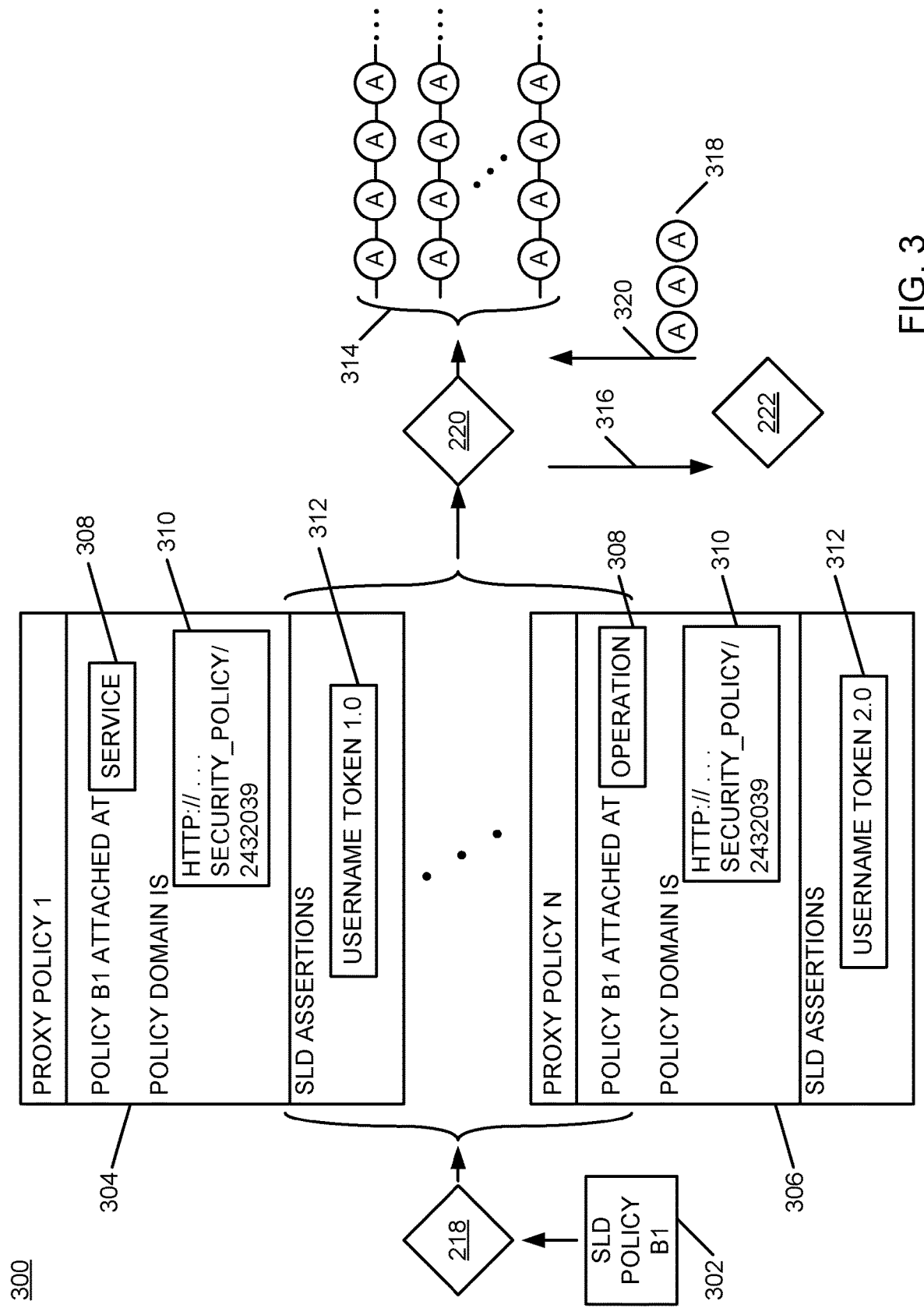
FIG. 3 is a diagram of an example of an implementation of a policy transformation flow for dynamic generation of policy enforcement rules and actions from policy attachment semantics for a service level definition (SLD) according to an embodiment of the present subject matter.
Figure 4:
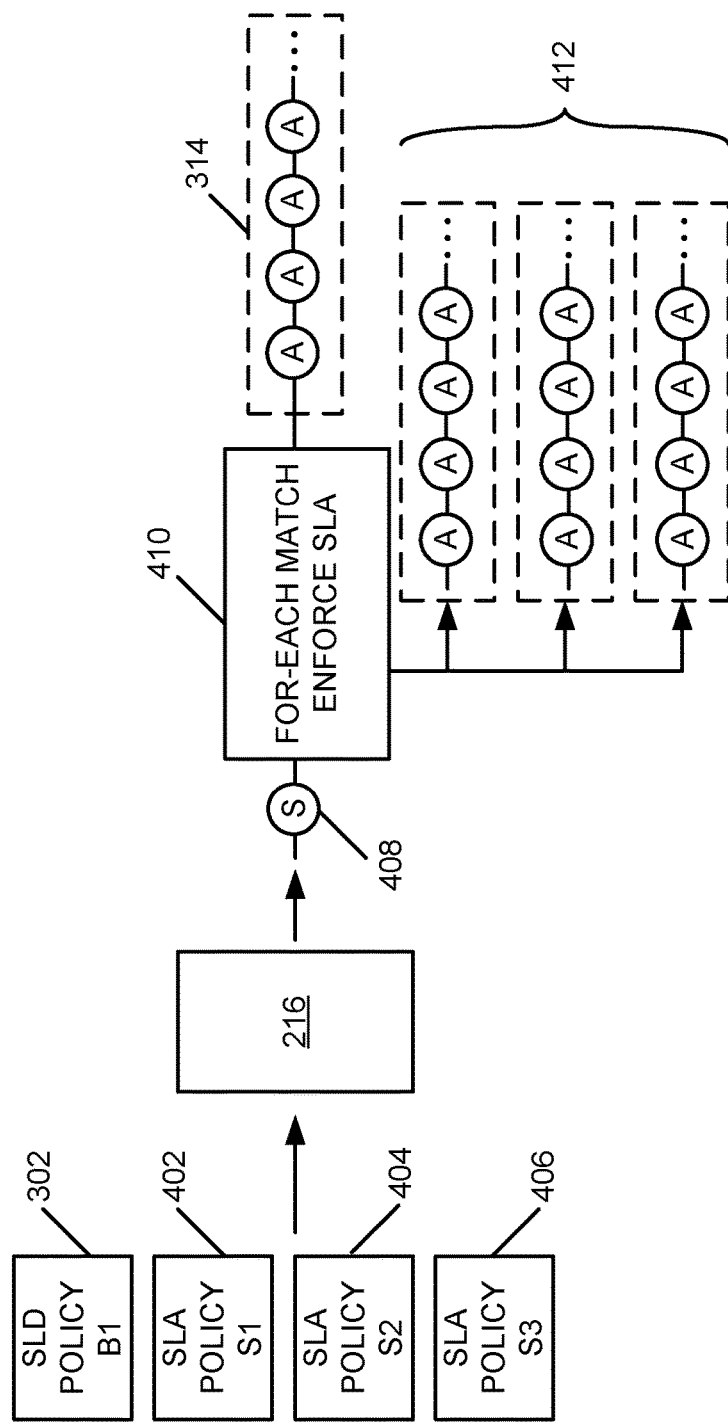
FIG. 4 is a diagram of an example of an implementation of a policy transformation flow for dynamic generation of policy enforcement rules and actions from policy attachment semantics for a service level definition (SLD) and service level agreements (SLAs), and runtime enforcement according to an embodiment of the present subject matter.
Figure 5:
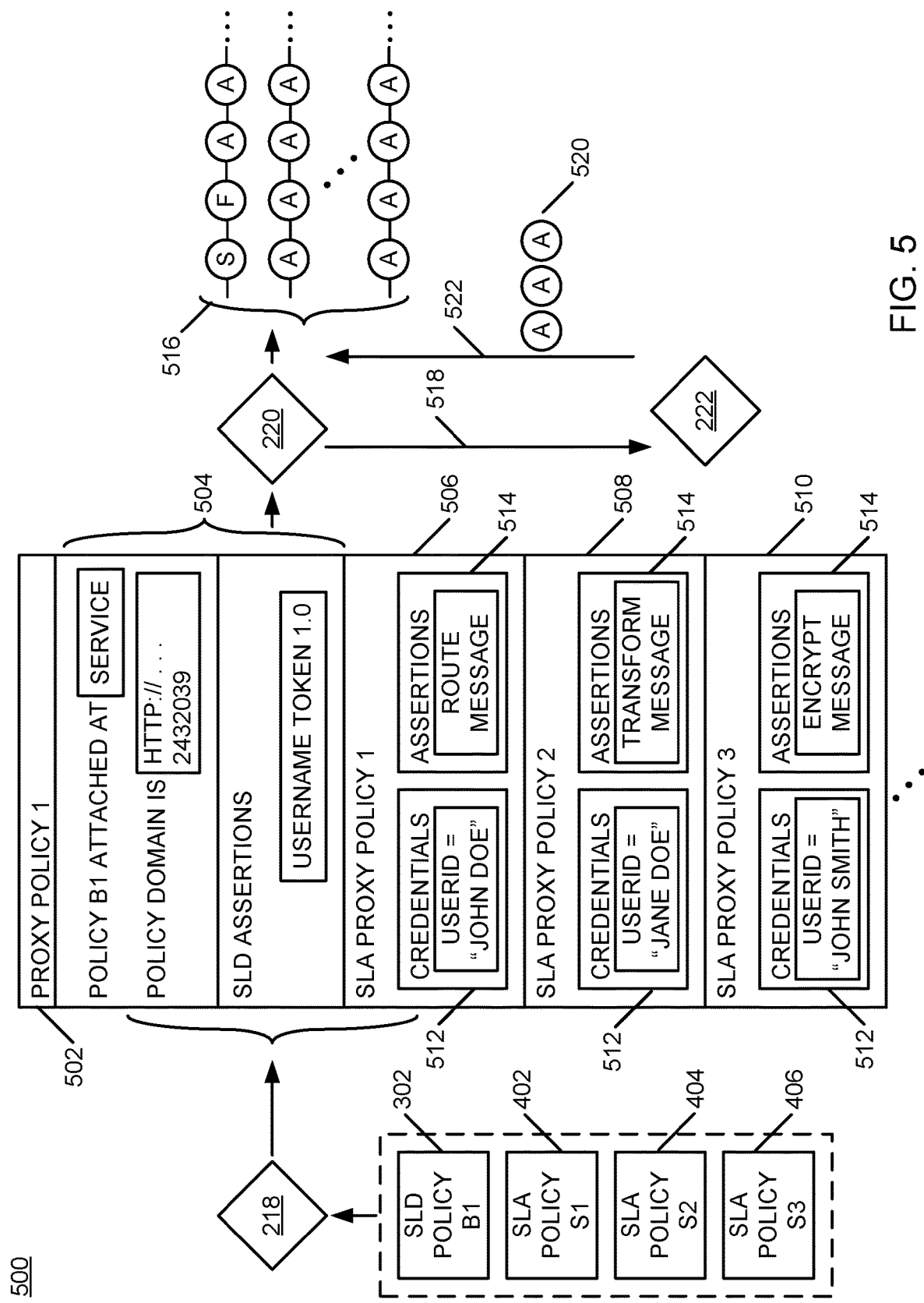
FIG. 5 is a diagram of an example of an implementation of a policy transformation flow for dynamic generation of policy enforcement rules and actions from policy attachment semantics for a service level definition (SLD) and service level agreements (SLAs) based upon the example SLD and SLAs described in FIG. 4 according to an embodiment of the present subject matter.

FIG. 3 through FIG. 5 described below represent example processing flows for transformation of different policy types to policy enforcement rules. The example processing flows for transformation of different policy types to policy enforcement rules represented within FIG. 3 through FIG. 5 are described for purposes of example. However, it should be noted that many possibilities exist for policy transformation for enforcement in association with one or more PEPs, and all such possibilities are considered within the scope of the present technology.

FIG. 3 is a diagram of an example of an implementation of a policy transformation flow 300 for dynamic generation of policy enforcement rules and actions from policy attachment semantics for a service level definition (SLD). As can be seen from FIG. 3, certain sub-components of the policy framework module 216 are represented, specifically the policy parser 218, the processing rule generator (PRG) 220, and the policy domain assertion to policy action mapper 222. To avoid congestion within the drawing, the reference numerals of the respective components are depicted rather than associated text names.

A policy_B1 302 represents an SLD of a service provider that is to be enforced by a PEP. The policy parser 218 consumes the original representation of the policy_B1 302 and generates/creates a number of policy proxy objects from the original policy_B1 302. The generated policy proxy objects within the present example include proxy policy_1 304 through policy proxy_N 306. Each of the proxy policy_1 304 through the proxy policy_N 306 contains similar information, based upon information within the original policy_B1 302. The effective policies represent locally-created processing entities that specify policy enforcement constraints (e.g., such as policy subjects, credentials, assertions, etc.) to be enforced by a PEP based upon policy information and enforceable policy provisions within the policy_B1 302. As such, the effective policies map the policy information and enforceable policy provisions within the policy_B1 302 to policy enforcement constraints from which processing rules and processing actions may be created.

A policy subject 308 is shown within the proxy policy_1 304 to be attached to a "service" policy subject. In the proxy policy_N 306, the policy subject 308 is shown to be attached to an "operation" policy subject. As such, the respective effective policies have been created from information within the policy_B1 302 and have been attached to different policy subjects for eventual enforcement.

A policy domain 310 within the proxy policy_1 304 identifies a uniform resource locator (URL) that represents, for purposes of example, a location of a policy domain to be enforced. It should be noted that other forms of identification of policy domains are possible and all such possibilities are considered to be within the scope of the present subject matter. Within the present example, the URL is illustrated with ellipsis dots for convenience to represent an accessible storage location that references a security policy domain of "2432039." A policy domain 310 within the proxy policy_N 306 references the same policy domain as the policy domain 310 within the proxy policy_1 304.

The proxy policy_1 304 also includes an SLD assertions identifier 312 with a value of "USERNAME TOKEN 1.0" that maps, for example, to a "sp:WssUsernameToken10" policy constraint associated within the policy_B1 302. An example of such a policy was described in association with the pseudo-syntax policy example above. An SLD assertions identifier 312 within the proxy policy_N 306 includes a value of "USERNAME TOKEN 2.0." As such, each of the respective SLD assertion identifiers 312 may include different assertions, as specified by the SLD policy_B1 302.

Each of the effective policies parsed and generated from the policy_B1 302 may then be processed one by one by the processing rule generator (PRG) 220 to create a processing rule for each proxy policy object. The collection/set of processing rules that result are represented as a policy enforcement rule 314. To generate the policy enforcement rule 314 with its set of processing rules that include the respective processing actions, the PRG 220 calls/invokes the policy domain assertion to policy action mapper 222 sub-component to process each proxy policy 304 through 306, as represented for each of the proxy policy 304 through 306 by the single arrow 316. The PRG 220 passes the policy domain and list of assertions for that particular domain to the policy domain assertion to policy action mapper 222.

In response to being invoked with the policy domain and list of assertions for that particular domain, the policy domain assertion to policy action mapper 222 maps or converts (e.g., transforms) each of those assertions to create corresponding processing actions 318. The policy domain assertion to policy action mapper 222 returns the created processing actions 318 to the PRG 220, as represented by the arrow 320. The PRG 220 then populates the processing rule 314 with the created processing actions 318. The PRG 220 iteratively processes each proxy policy 304 through 306 and creates a corresponding processing rule within the policy enforcement rule 314. The PRG 220 outputs the created policy enforcement rule 314 to each PEP that is tasked with policy enforcement for the particular SLD(s) associated with the policy_B1 302. As such, the policy framework module 216 generates policy enforcement rules (processing rules for each proxy policy object that include processing actions to be performed) from the runtime constraints associated with policies and distributes the created policy enforcement rules to the respective PEPs to enforce. This processing may be performed for each policy and for each SLD.

Additional complexities exist with respect to enforcement of SLAs. For example, with SLAs, the task of the policy framework module 216 described above is more complicated. A policy subject may contain a number of SLAs. These SLAs are determined at runtime based upon the contents (e.g., user credentials, etc.) of the respective objects being processed to determine which, if any, policy enforcement rules are to be enforced.

FIG. 4 is diagram of an example of an implementation of a policy transformation flow 400 for dynamic generation of policy enforcement rules and actions from policy attachment semantics for a service level definition (SLD) and service level agreements (SLAs), and runtime enforcement. The policy framework module 216 is again illustrated along with the policy_B1 302 as described above. The policy enforcement rule 314 that defines processing rules (and processing actions) for enforcement of the policy_B1 302 is again illustrated.

Additionally, an SLA policy_S1 402, an SLA policy_S2 404, and an SLA policy_S3 406 are illustrated. The policy framework 216 consumes the SLA policies 402 through 406. Within this example, the SLAs would be attached at a "service" policy-subject. The policy framework module 216 creates a parent processing rule for the "service" policy subject. The parent processing rule includes an SLA check action 408, and for-each match and enforce operation (loop) logic 410 used to select processing rules to be applied during runtime to enforce the respective SLA policies 402 through 406.

The SLA check action 408 includes requirements specified in the SLA policies 402 through 406 to match against during runtime, along with the corresponding processing rule that contains the respective policy implementation. During runtime, the SLA check action 408 outputs a list of zero (0) or more processing rules 412 that match content (e.g., user credentials, etc.) within the particular message being processed. The for-each match and enforce operation (loop) logic 410 may then take the list of matching processing rules 412 and make a call to apply each of the matching processing rules 412, one by one. The processing actions from the SLD policy_B1 302, if any, may then be enforced after the matching SLA processing rules 412.

FIG. 5 is diagram of an example of an implementation of a policy transformation flow 500 for dynamic generation of policy enforcement rules and actions from policy attachment semantics for a service level definition (SLD) and service level agreements (SLAs) based upon the example SLD and SLAs described in FIG. 4. As can be seen from FIG. 5, again certain sub-components of the policy framework module 216 are represented, specifically the policy parser 218, the processing rule generator (PRG) 220, and the policy domain assertion to policy action mapper 222 depicted. To avoid congestion within the drawing, the reference numerals of the respective components are depicted rather than associated text names. As well, the policy_B1 302 that represents an SLD of a service provider, and the SLA policy_S1 402, SLA policy_S2 404, and SLA policy_S3 406 of FIG. 4 are again illustrated.

A proxy policy_1 502 is illustrated. It is understood that many effective policies may be created based upon a set of policies represented by the SLD policy_B1 302 and the SLA policies 402 through 406. However, because of the detail illustrated within the proxy policy_1 502 in FIG. 5, only this one proxy policy object is illustrated. The ellipsis dots below the proxy policy_1 502 represent the continuation of the created effective policies to include the additional effective policies that may be created.

Within this example, the policy parser 218 annotates each proxy policy object with additional information, along with the associated SLD policy assertion(s) from the Policy_B1 302, the credentials that are to be matched for each SLA, and the corresponding assertions that are to be used to enforce the respective policies. As can be seen from FIG. 6, an SLD proxy policy portion 504 represents a similar effective policy as the proxy policy_1 304 of FIG. 3. As such, additional description of this portion of the proxy policy_1 502 may be obtained with reference to FIG. 3 as described above.

Additionally, an effective proxy policy object for each of the SLA policy_S1 402, SLA policy_S2 404, and SLA policy_S3 406 is represented in association with the proxy policy_1 502. The policy parser 218 creates an effective SLA proxy policy_1 506 from the SLA policy_S1 402, creates an effective SLA proxy policy_2 508 from the SLA policy_S2 404, and creates an effective SLA proxy policy_3 510 from the SLA policy_S3 406. As can be seen within the effective SLA proxy policy_1 506, each of the effective SLA proxy policy_1 506, the effective SLA proxy policy_2 508, and the effective SLA proxy policy_3 510 form a portion of the proxy policy_1 502.

Each of the effective SLA proxy policy_1 506, the effective SLA proxy policy_2 508, and the effective SLA proxy policy_3 510 includes a credentials field 512 and an assertions field 514. Within the effective SLA proxy policy_1 506, the value of the credentials field 512 is "USERID=JOHN DOE." As such, messages that are processed during runtime with a user identifier of "JOHN DOE" will be identified, and the effective SLA proxy policy_1 506 selected for processing those messages. The value of the assertions field 514 within the effective SLA proxy policy_1 506 is set to "ROUTE MESSAGE," which indicates that messages associated with this user identifier are to be routed without any additional transformation or encoding. Additionally, it should be noted that the inclusion of the user identifier for "JOHN DOE," and only that user identifier, also satisfies the "ExactlyOne" policy provision to be enforced for the SLD policy_B1 302.

Within the effective SLA proxy policy_2 508, the value of the credentials field 512 is "USERID=JANE DOE." As such, messages that are processed during runtime with a user identifier of "JANE DOE" will be identified, and the effective SLA proxy policy_2 508 selected for processing those messages. The value of the assertions field 514 within the effective SLA proxy policy_2 508 is set to "TRANSFORM MESSAGE," which indicates that messages associated with this user identifier are to be transformed. Any transformation appropriate for a given SLA and implementation may be utilized. Additionally, it should be noted that the inclusion of the user identifier for "JANE DOE," and only that user identifier, also satisfies the "ExactlyOne" policy provision to be enforced for the SLD policy_B1 302.

Within the effective SLA proxy policy_3 510, the value of the credentials field 512 is "USERID=JOHN SMITH." As such, messages that are processed during runtime with a user identifier of "JOHN SMITH" will be identified, and the effective SLA proxy policy_3 510 selected for processing those messages. The value of the assertions field 514 within the effective SLA proxy policy_3 510 is set to "ENCRYPT MESSAGE," which indicates that messages associated with this user identifier are to be encrypted. Any encryption protocol/technique appropriate for a given SLA and implementation may be utilized. For example, a message may be encrypted using RSA, AES, or 3DES, or other encryption protocols as appropriate for a given implementation. Additionally, it should be noted that the inclusion of the user identifier for "JOHN SMITH," and only that user identifier, also satisfies the "ExactlyOne" policy provision to be enforced for the SLD proxy policy_B1 302.

As described above in association with FIG. 3, the processing rule generator (PRG) 220 again interacts with the policy domain assertion to policy action mapper 222. Each of the effective proxy policies generated from the policy_B1 302 and the SLA policies 402 through 406 (e.g., the SLA proxy policy_1 502 and others) may then be processed one by one by the processing rule generator (PRG) 220 to create a processing rule for each proxy policy object (e.g., effective policy). The collection/set of processing rules that result are represented as a policy enforcement rule 516. To generate the policy enforcement rule 516 with its set of processing rules that include the respective processing actions, the PRG 220 calls/invokes the policy domain assertion to policy action mapper 222 sub-component to process each proxy policy object, as represented for each proxy policy object by the single arrow 518. The PRG 220 passes the policy domain and list of assertions for that particular domain to the policy domain assertion to policy action mapper 222.

In response to being invoked with the policy domain and list of assertions for that particular domain, the policy domain assertion to policy action mapper 222 maps or converts (e.g., transforms) each of those assertions to create corresponding processing actions 520. The policy domain assertion to policy action mapper 222 returns the created processing actions 520 to the PRG 220, as represented by the arrow 522. The PRG 220 then populates the processing rule 516 with the created processing actions 520. The PRG 220 iteratively processes each proxy policy object (e.g., the SLA proxy policy_1 502 and others) and creates a corresponding processing rule within the policy enforcement rule 516. The PRG 220 outputs the created policy enforcement rule 516 to each PEP that is tasked with policy enforcement for the particular SLD(s) associated with the policy_B1 302 and the SLA policies 402 through 406. As such, the policy framework module 216 generates policy enforcement rules (processing rules for each proxy policy object that include processing actions to be performed) from the runtime constraints associated with policies, and distributes the created policy enforcement rules to the respective PEPs to enforce. This processing may be performed for each policy, for each SLD, and for each SLA.

Regarding additional details of the created policy enforcement rule 516, the PRG 220 may again create the parent rule (represented within the first row of the policy enforcement rule 516). The PRG 220 may populate the parent rule with an SLA Check action (represented by the "S" within the first row, first element of the policy enforcement rule 516). Then, for each SLA policy, the PRG 220 may append the credentials match to the SLA check action, create another empty rule, and append the rule name to the SLA check action. This new processing rule may then be populated with the processing actions that result from the assertions of the respective SLA policy 402 through 406 (represented by the additional rows of the policy enforcement rule 516).

Once processing to transform all the SLA policies to SLA processing rules and processing actions has been completed, the for-each and enforce operation (represented by the "F" within the first row, second element, of the policy enforcement rule 516) may be added to the parent processing rule.

The SLA processing rules may be added/appended to the parent processing rule as child processing rules to form a completed policy enforcement rule usable to enforce the provision of the original policy.

During runtime enforcement, the loop construct associated with the for-each and enforce operation takes in as input the list of processing rule names for SLA processing rules generated by the SLA check action. For each rule name, the process iteratively calls or enforces the respective processing rules, and thereby enforces the processing actions contained within the respective processing rules. The SLD processing rule(s) generated from the SLD assertions may also be appended to the parent processing rule (represented by the remainder of the first row of the policy enforcement rule 516). The SLD processing rule(s) may be applied after the SLA processing rules have been applied.

As such, the policy framework 216 provides dynamic rule creation and processing. As any change to a policy is made, the processing rules and actions associated with the respective policy may be recreated by the policy framework 216, the previous processing rules and processing actions may be removed and replaced by the newly-created processing rules and processing actions. Accordingly, policy implementation and enforcement, policy maintenance, and policy adaptation to changes may be improved by use of the present technology.

Figure 6:
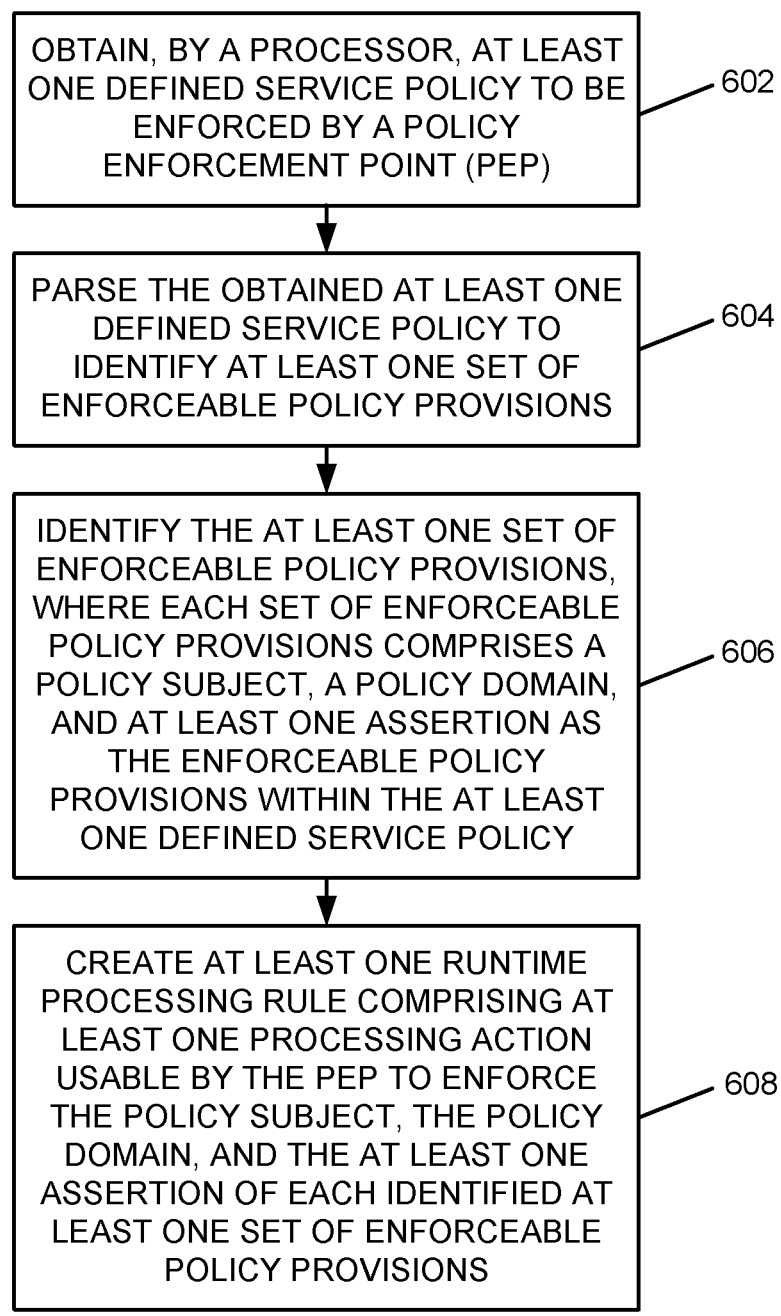
FIG. 6 is a flow chart of an example of an implementation of a process for dynamic generation of policy enforcement rules and actions from policy attachment semantics according to an embodiment of the present subject matter.
Figure 7:
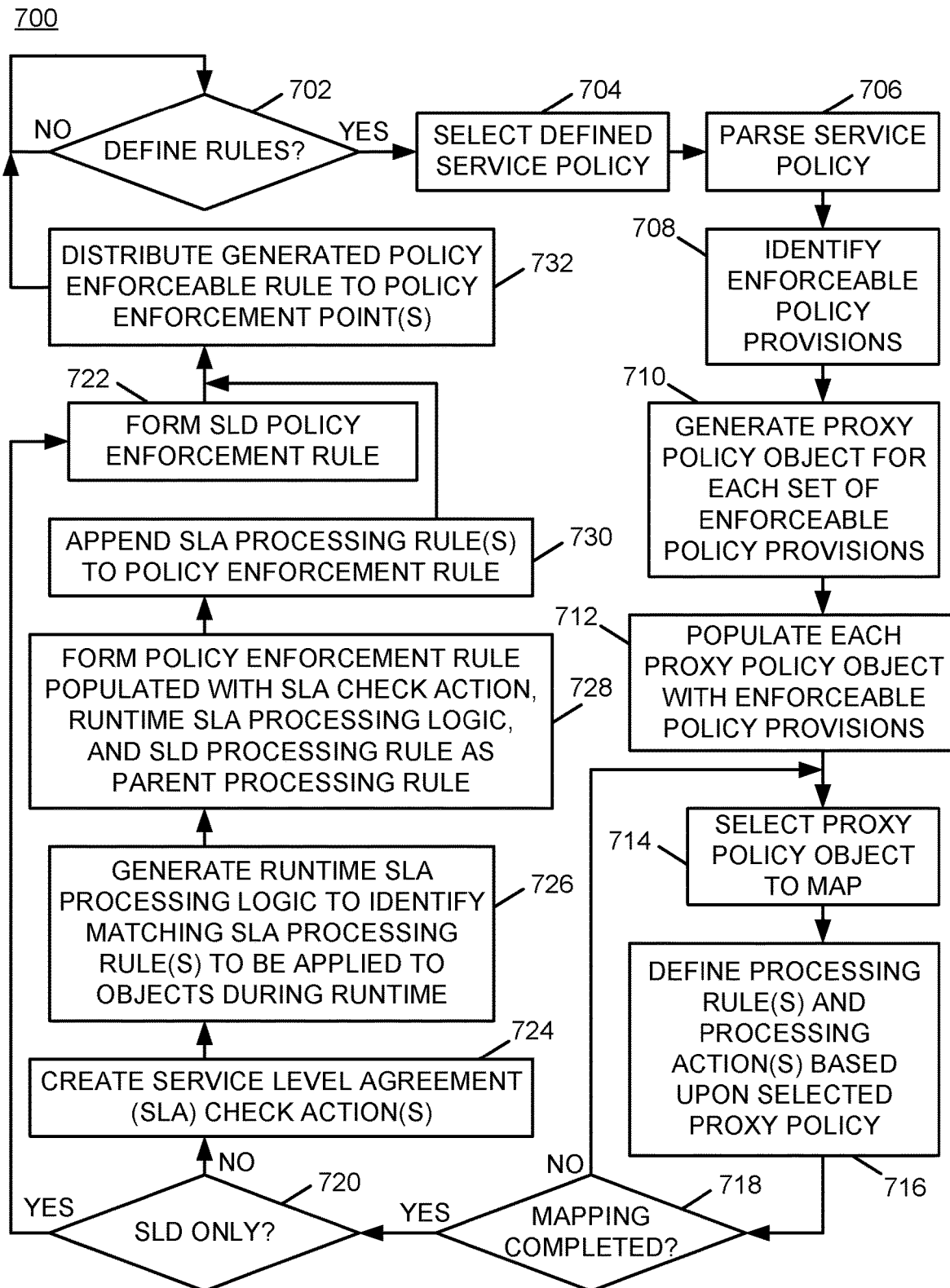
FIG. 7 is a flow chart of an example of an implementation of a process for dynamic generation of policy enforcement rules and actions from policy attachment semantics for both service level definitions (SLDs) and service level agreements (SLAs) according to an embodiment of the present subject matter.
Figure 8:
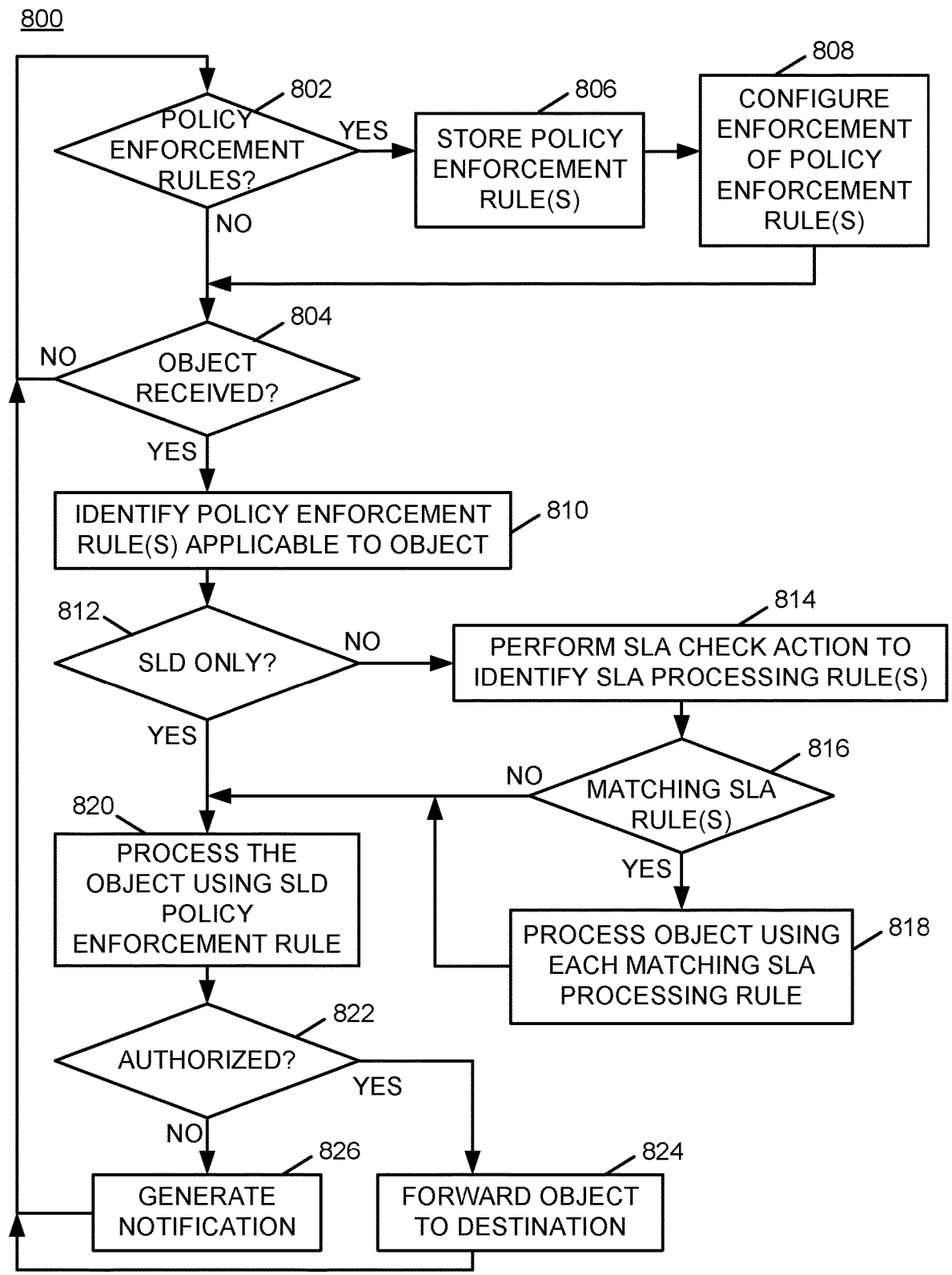
FIG. 8 is a flow chart of an example of an implementation of a process for dynamic deployment and enforcement of policy enforcement rules and actions at policy enforcement points (PEPs) according to an embodiment of the present subject matter.

FIG. 6 through FIG. 8 described below represent example processes that may be executed by devices, such as the core processing module 200, to perform the dynamic generation of policy enforcement rules and actions from policy attachment semantics associated with the present subject matter. Many other variations on the example processes are possible and all are considered within the scope of the present subject matter. The example processes may be performed by modules, such as the policy framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for dynamic generation of policy enforcement rules and actions from policy attachment semantics. At block 602, the process 600 obtains, by a processor, at least one defined service policy to be enforced by a policy enforcement point (PEP). At block 604, the process 600 parses the obtained at least one defined service policy to identify at least one set of enforceable policy provisions. At block 606, the process 600 identifies the at least one set of enforceable policy provisions, where each set of enforceable policy provisions comprises a policy subject, a policy domain, and at least one assertion as the enforceable policy provisions within the at least one defined service policy. At block 608, the process 600 creates at least one runtime processing rule comprising at least one processing action usable by the PEP to enforce the policy subject, the policy domain, and the at least one assertion of each identified at least one set of enforceable policy provisions.

FIG. 7 is a flow chart of an example of an implementation of a process 700 for dynamic generation of policy enforcement rules and actions from policy attachment semantics for both service level definitions (SLDs) and service level agreements (SLAs). At decision point 702, the process 700 makes a determination as to whether a request to define processing rules and processing actions (collectively policy enforcement rules) for one or more defined service policies has been detected. A request to define policy enforcement rules may be detected, for example, in response to an addition of a new service policy definition or a change to an existing service policy definition within a policy repository, such as the policy registry 114, or may be detected otherwise as appropriate for a given implementation.

In response to determining at decision point 702 that a request to define processing rules and processing actions (collectively policy enforcement rules) for one or more defined service policies has been detected, the process 700 selects/obtains a defined service policy to process at block 704. The selected service policy may be, for example, a service level definition (SLD) that protects service provider infrastructure access and utilization constraints, or may be a service level agreement (SLA) that represents an agreement for services and a level of service between a service provider and a consumer.

At block 706, the process 700 parses the selected service policy to identify enforceable policy provisions. At block 708, the process 700 identifies enforceable policy provisions within the parsed service policy. It should be noted, that the identified enforceable policy provisions may include a policy subject, a policy domain, and at least one assertion. It should further be noted, that there may be one or more sets of enforceable policy provisions within the parsed service policy, as described above. At block 710, the process 700 generates at least one local proxy policy object that includes policy enforcement constraints based upon the identified policy subject, policy domain, and at least one assertion of the at least one defined service policy that represent the enforceable policy provisions. At block 712, the process 700 populates each proxy policy object with the identified enforceable policy provisions.

At block 714, the process 700 begins iterative processing of the generated proxy policy objects to map the generated proxy policy objects to runtime-executable processing rules and processing actions, and selects a proxy policy object to map. At block 716, the process 700 defines/creates at least one runtime processing rule that includes at least one processing action usable by the PEP to enforce the identified policy subject, policy domain, and at least one assertion of the defined service policy represented by the selected policy proxy object.

At decision point 718, the process 700 makes a determination as to whether mapping of the generated proxy policy objects to processing rules and processing actions is completed. In response to determining that at least one additional proxy policy object is available to map to runtime-executable processing rules and processing actions (i.e., the mapping is not completed), the process 700 returns to block 714 and iterates as described above.

In response to determining at decision point 718 that all generated proxy policy objects have been mapped to runtime-executable processing rules and processing actions, the process 700 makes a determination at decision point 720 as to whether the mapped proxy policy objects represent one or more SLD policies only, or whether the mapped proxy policy objects additionally represent one or more SLAs. In response to determining that the mapped proxy policy objects represent one or more SLD policies only, the process 700 forms an SLD policy enforcement rule from the mapped processing rules and processing actions at block 722.

Returning to the description of decision point 720, in response to determining that the mapped proxy policy objects additionally represent one or more SLAs, at block 724 the process 700 creates one or more service level agreement (SLA) check actions usable to select SLA processing rules during runtime based upon the contents of the objects under processing during runtime. At block 726, the process 700 generates runtime SLA processing logic to identify matching SLA processing rules to be applied to objects during runtime for SLA policy enforcement. As described above, the generated runtime SLA processing logic may include a for-each match loop that processes and enforces each appropriate SLA processing rule based upon the contents of the object under processing during runtime. At block 728, the process 700 forms a policy enforcement rule populated with the SLA check action and the runtime SLA processing logic, and designates the SLA processing rule as a parent processing rule within the policy enforcement rule. At block 730, the process 700 appends one or more processing rules that include one or more processing actions mapped from the respective SLA policy proxy objects. As described above, the processing rules and processing actions mapped from the SLA policy proxy objects are useable during runtime to enforce the defined SLA policies.

In response to appending the SLA processing rules to the policy enforcement rule at block 730, or in response to forming the SLD policy enforcement rule at block 722, the process 700 distributes the generated policy enforcement rule to one or more policy enforcement points (PEPs) at block 732. Where the process 700 is executed by a policy enforcement point, distribution of the generated policy enforcement rule may include locally implementing the generated policy enforcement rule, and may also include distribution of the generated policy enforcement rule to one or more other PEPs. The process 700 returns to decision point 702 and iterates as described above.

As such, the process 700 obtains defined service policies reinforced by one or more PEPs, generates proxy policy objects based upon the contents of the defined service policies, maps generated proxy policy objects to processing rules and processing actions, and generates policy enforcement rules. The generated policy enforcement rules are usable during runtime to enforce the original defined service policies at one or more PEPs. The process 700 distributes the generated policy enforcement rules for enforcement to one or more PEPs to deploy the generated policy enforcement rules. It should be noted that the process 700 is dynamic and may be triggered at any time to update deployed policy enforcement rules based upon changes to service policy definitions and/or the addition or deletion of defined service policies. Accordingly, the process 700 provides a flexible and manageable platform by which to deploy and maintain enforcement logic for defined service policies.

FIG. 8 is a flow chart of an example of an implementation of a process 800 for dynamic deployment and enforcement of policy enforcement rules and actions at policy enforcement points (PEPs). The process 800 may be implemented, for example, at a PEP. At decision point 802, the process 800 makes a determination as to whether one or more policy enforcement rules have been received or created locally based upon defined service policies. It should be noted, as described above, that the policy enforcement rules may be created dynamically in response to changes to defined service policies or additions and deletions of defined service policies. A process such as the process 700 described above in association with FIG. 7 may be used to dynamically create policy enforcement rules and the output of such a process may be provided to the process 800 for enforcement of the dynamically created policy enforcement rules.

In response to determining that one or more policy enforcement rules have not been received, the process 800 makes a determination at decision point 804 as to whether an object for which runtime enforcement of policy enforcement rules has been received. The respective object may be received from a service provider or from a customer. As described above, the object may include a service request selected such as a transaction, a web request, a database request, a representational state transfer (REST) service, and a web application, a message, or any other object for which policy enforcement may be enforced. As also described above, a PEP that executes a process such as the process 800 acts as a proxy for both a service provider and a customer between which the object is communicated. In response to determining at decision point 804 that an object for which runtime enforcement of policy enforcement rules has not been received, the process 800 returns to decision point 802 and iterates as described above.

In response to determining at decision point 802 that one or more policy enforcement rules has been received or created locally based upon defined service policies, the process 800 stores the respective policy enforcement rule(s) at block 806. At block 808, the process 800 configures enforcement of the respective policy enforcement rule(s). As such, the respective policy enforcement rules may be enforced by the PEP. Returning to the description of decision point 804, in response to determining that an object for which runtime enforcement of policy enforcement rules has been received, the process 800 identifies a defined policy enforcement rule that includes the defined runtime processing rule(s) applicable to enforce the defined service policy for which the policy enforcement rule was created against the object during runtime at block 810.

As described above, processing rules may include SLD processing rules and may also include SLA processing rules. Where both an SLD processing rule and one or more SLA processing rules are included in the same policy enforcement rule, the SLD processing rule is considered a parent processing rule and is configured to be executed after any child SLA processing rules. As such, at decision point 812, the process 800 makes a determination as to whether the defined policy enforcement rule includes one or more SLD processing rules for enforcement of a defined SLD policy only, or whether the defined policy enforcement rule includes processing rules for enforcement of one or more SLAs in addition to an SLD.

In response to determining at decision point 812 that the defined policy enforcement rule additionally includes at least one processing rule for enforcement of one or more SLAs, the process 800 performs an SLA check action on the object to identify the appropriate SLA processing rule(s) at block 814. As also described above, the processing for SLA enforcement is dynamic and is based upon the contents of the object at runtime. As such, the process 800 may, for example, determine a first SLA processing rule associated with a first user credential for one object and may determine a second/different SLA processing rule associated with a second user credential for another object. Accordingly, the process 800 may dynamically adjust the processing actions of the defined processing rules according to the first SLA processing rule of the first user credential and according to the second SLA processing rule for the second user credential. Many other variations on dynamic SLA processing rule selection and enforcement are possible and all are considered to be within the scope of the present subject matter.

At decision point 816, the process 800 makes a determination as to whether the SLA check action identified any matching SLA processing rules to be enforced against the object. In response to determining that at least one matching SLA processing rule has been identified to be enforced against the object, the process 800 performs iterative processing for each matching SLA processing rule to process the object using the respective matching SLA processing rule(s) at block 818.

In response to determining at decision point 816 that no matching SLA processing rules have been identified to be enforced against the object, or in response to processing the object using each matching SLA processing rule at block 818, or in response to determining at decision point 812 that the defined policy enforcement rule only includes one or more SLD processing rules for enforcement of a defined SLD policy, the process 800 proceeds to process the object using the SLD policy enforcement rule at block 820. As described above, in the case of a policy enforcement rule that includes both SLD and SLA processing rules, the SLD policy enforcement rule is considered the parent processing rule and is configured to be executed after any child SLA processing rules. As such, the process 800 enforces the respective SLD processing rule(s) last after processing each matching SLA processing rule on the object, where appropriate.

At decision point 822, the process 800 makes a determination as to whether the object is authorized to be forwarded to the destination based upon the applied policy enforcement rule. In response to determining that the object is authorized to be forwarded to the destination based upon the applied policy enforcement rule, the process 800 forwards the object to the destination at block 824. In response to determining that the object is not authorized to be forwarded to the destination based upon the applied policy enforcement rule, the process 800 generates a notification (e.g., error notification, log entry, etc.) at block 826, and does not forward the object to the destination. In response to either forwarding the object to the destination at block 824 or in response to generating the notification at block 826, the process 800 returns to decision point 802 and iterates as described above.

As such, policy enforcement within a policy enforcement point (PEP) may be implemented using a process such as the process 800 to dynamically process objects based upon content of the objects during runtime. This processing may be based upon defined runtime processing rules that include runtime processing actions that enforce defined service policies for service providers and contractual agreements between service providers and customers.

As described above in association with FIG. 1 through FIG. 8, the example systems and processes provide dynamic generation of policy enforcement rules and actions from policy attachment semantics. Many other variations and additional activities associated with dynamic generation of policy enforcement rules and actions from policy attachment semantics are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method comprising:
    detecting, by a processor, a change in a policy registry of an original policy, wherein the change in the policy registry is based, in part, on changes to policy definitions;
    generating a policy enforcement rule from a service policy responsive to detecting a change in a policy registry, wherein generating the policy enforcement rule includes:
        generating one or more processing actions from an intermediate policy proxy object, wherein the intermediate policy proxy object is derived from the service policy,
        processing the one or more processing actions, wherein processing the one or more processing actions produce one or more policy enforcement processing rules having an ordered sequence of the one or more processing actions, and
        selecting the policy enforcement rule based, at least in part on the one or more policy enforcement processing rules and policy attachment semantics derived from the service policy; and
    transforming the service policy from an original policy to the policy enforcement rule.

2. The computer-implemented method of claim 1, further comprising an intermediary system that operates to enforce the service policy, wherein the intermediary system is a policy enforcement point (PEP).

3. The computer-implemented method of claim 2, wherein the intermediate policy proxy object are locally-created processing entities that specify one or more policy enforcement constraints by the PEP.

4. The computer-implemented method of claim 3, wherein each of the one or more policy enforcement constraints include a policy domain, and a list of assertions.

5. The computer-implemented method of claim 4, wherein generating the one or more processing actions further comprises:
    mapping the list of assertions for the intermediate policy proxy object, wherein the list of assertions are mapped by a policy actions mapper to create one or more processing actions for the policy domain corresponding to the intermediate policy proxy object.

6. The computer-implemented method of claim 5, further comprising:
    providing processing rules with the one or more processing actions created by the policy action mapper for the intermediate policy proxy object; and
    iteratively processing the intermediate policy proxy object to generate the policy enforcement rule.

7. The computer-implemented method of claim 6, further comprising:
    producing the policy enforcement rule to each PEP tasked with policy enforcement of the service policy.

8. The computer-implemented method of claim 4, wherein the policy domain comprises a uniform resource locator (URL) representing a location of the policy domain enforced by the PEP.

9. The computer-implemented method of claim 1, wherein the service policy can be either a service level definition (SDL) or a service level agreement (SLA).

10. The computer-implemented method of claim 1, wherein the one or more policy attachment semantics further comprises at least one of vocabularies and definitions supported by the service policy.

11. A non-transitory computer program product, the non-transitory computer program product comprising one or more computer readable storage media and program instructions stored on the one or more computer readable storage media, the program instructions including instructions to:
    detect, by a processor, a change in a policy registry of an original policy, wherein the change in the policy registry is based, in part, on changes to policy definitions;
    generate a policy enforcement rule from a service policy responsive to detecting a change in a policy registry, wherein generating the policy enforcement rule includes:
        generate one or more processing actions from an intermediate policy proxy object, wherein the intermediate policy proxy object is derived from the service policy,
        process the one or more processing actions, wherein processing the one or more processing actions produce one or more policy enforcement processing rules having an ordered sequence of the one or more processing actions, and
        select the policy enforcement rule based, at least in part on the one or more policy enforcement processing rules and policy attachment semantics derived from the service policy; and
    transform the service policy from an original policy to the policy enforcement rule.

12. The computer program product of claim 11, further comprising an intermediary system that operates to enforce the service policy, wherein the intermediary system is a policy enforcement point (PEP).

13. The computer program product of claim 12, wherein the intermediate policy proxy object are locally-created processing entities that specify one or more policy enforcement constraints by the PEP.

14. The computer program product of claim 13, wherein each of the one or more policy enforcement constraints include a policy domain, and a list of assertions.

15. The computer program product of claim 14, wherein generating the one or more processing actions further comprises:
    mapping the list of assertions for the intermediate policy proxy object, wherein the list of assertions are mapped by a policy actions mapper to create one or more processing actions for the policy domain corresponding to the intermediate policy proxy object.

16. The computer program product of claim 15, further comprising:
    providing processing rules with the one or more processing actions created by the policy action mapper for the intermediate policy proxy object; and
    iteratively processing the intermediate policy proxy object to generate the policy enforcement rule.

17. The computer program product of claim 16, further comprising:
    producing the policy enforcement rule to each PEP tasked with policy enforcement of the service policy.

18. The computer program product of claim 14, wherein the policy domain comprises a uniform resource locator (URL) representing a location of the policy domain enforced by the PEP.

19. The computer program product of claim 11, wherein the policy attachment semantics further comprises at least one of vocabularies and definitions supported by the service policy.

20. A computer system for transforming a service policy from an original policy to an updated policy, the computer system comprising:
    one or more computer processors;
    one or more computer readable storage media;
    computer program instructions;
    the computer program instructions being stored on the one or more computer readable storage media for execution by the one or more computer processors; and
    the computer program instructions including instructions to:
        detect, by a processor, a change in a policy registry of an original policy, wherein the change in the policy registry is based, in part, on changes to policy definitions;
    generate a policy enforcement rule from a service policy responsive to detecting a change in a policy registry, wherein generating the policy enforcement rule includes:
        generate one or more processing actions from an intermediate policy proxy object, wherein the intermediate policy proxy object is derived from the service policy,
        process the one or more processing actions, wherein processing the one or more processing actions produce one or more policy enforcement processing rules having an ordered sequence of the one or more processing actions, and
        select the policy enforcement rule based, at least in part on the one or more policy enforcement processing rules and policy attachment semantics derived from the service policy; and
    transform the service policy from an original policy to the policy enforcement rule.

* * * * *